Oct. 25, 1955  C. O. ROCHA  2,721,616
AUTOMOTIVE VEHICLE WITH CUSHION MOUNTED BODY
Filed Aug. 15, 1952  2 Sheets-Sheet 2
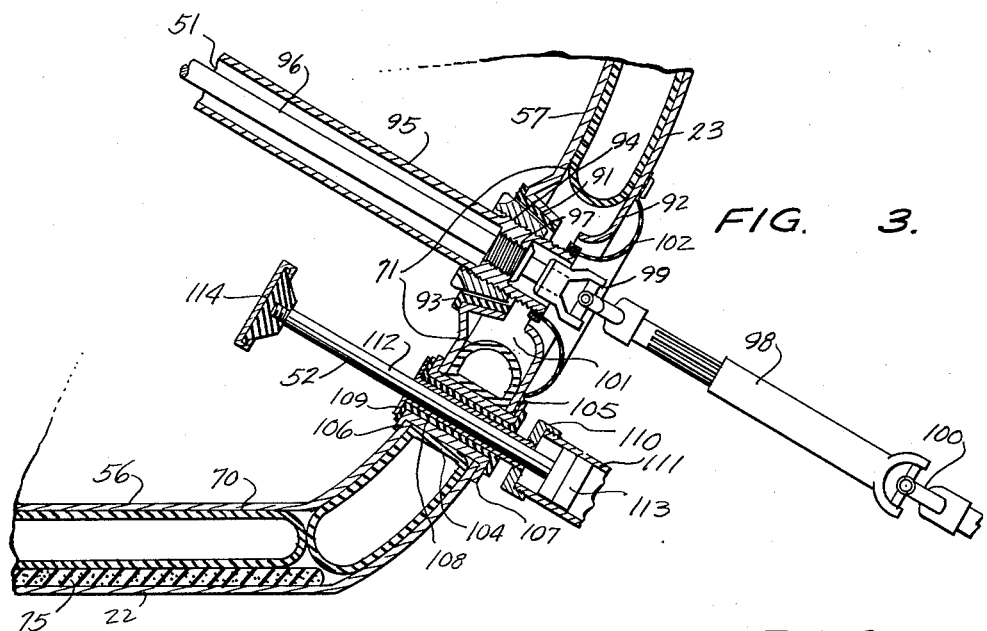
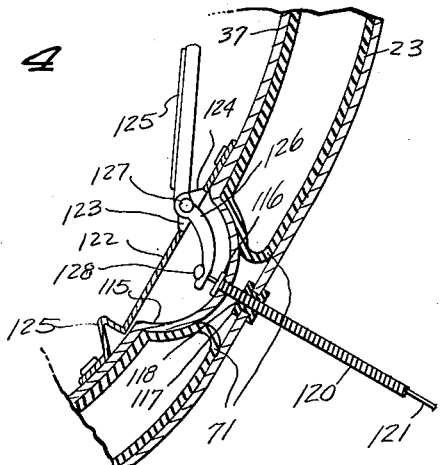
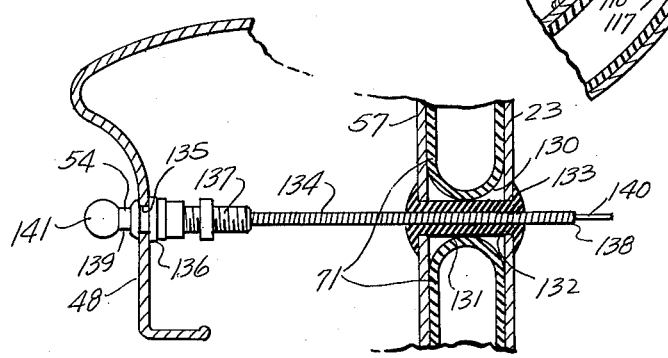
INVENTOR.
CRESPIN O. ROCHA,
BY
McMorrow, Berman + Davidson
ATTORNEYS.

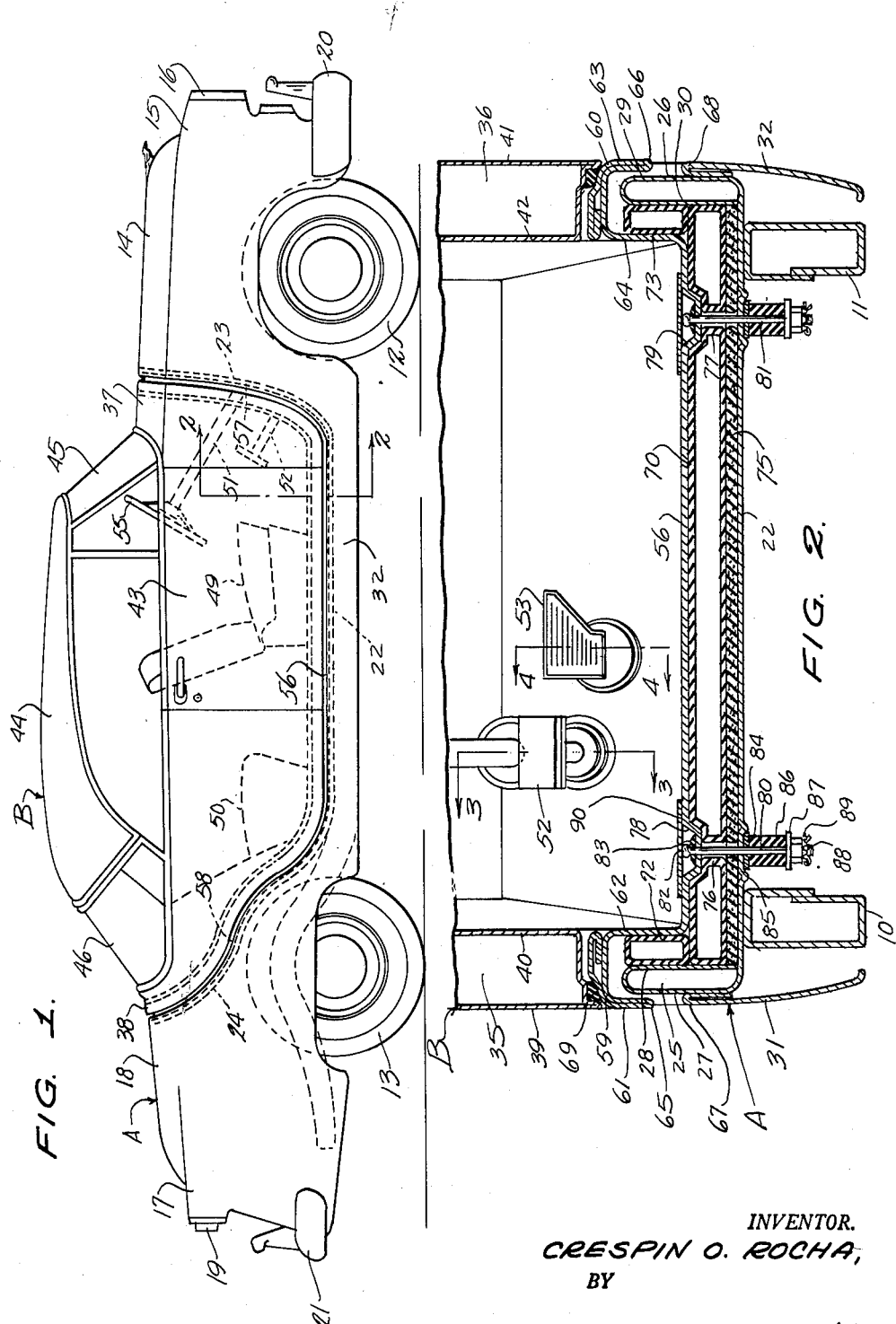

United States Patent Office 2,721,616
Patented Oct. 25, 1955

2,721,616

AUTOMOTIVE VEHICLE WITH CUSHION MOUNTED BODY

Crespin O. Rocha, Greeley, Colo.

Application August 15, 1952, Serial No. 304,621

3 Claims. (Cl. 180—90.6)

This invention relates to automotive passenger vehicles and more particularly to a vehicle having a chassis portion and a body or passenger compartment portion mounted on the chassis portion with pneumatic cushions interposed between the two portions.

It is among the objects of the present invention to provide an improved passenger vehicle including a wheel mounted chassis portion including the engine and all necessary driving and control apparatus for the vehicle and having a flat floor terminating forwardly in a fire wall and rearwardly in a rear or trunk wall, a separate body including passenger seats, instruments, steering wheel and control levers and having a flat floor and front and rear end walls, and pneumatic cushions supporting the body portion on the chassis portion of the vehicle for limited and resiliently resisted freedom of movement of the two vehicle portions relative to each other so that minor shocks and vibrations will not be transmitted from the chassis portion to the body portion of the vehicle; which includes means securely connecting the body portion to the chassis portion of the vehicle and providing a limited freedom of relative movement between the portions; which includes means extending the control levers or pedals and steering column through the pneumatic cushions and compensating for the relative movement between the two vehicle portions; and which is simple and durable in construction, economical to manufacture, and neat and attractive in appearance.

Other objects and advantages will become apparent from a consideration of the following description and the appended claims in conjunction with the accompanying drawings wherein:

Figure 1 is a side elevational view of an automotive passenger vehicle illustrative of the invention;

Figure 2 is a fragmentary transverse cross sectional view on an enlarged scale on the line 2—2 of Figure 1;

Figure 3 is a fragmentary cross sectional view on an enlarged scale on the line 3—3 of Figure 2;

Figure 4 is a fragmentary cross sectional view on an enlarged scale on the line 4—4 of Figure 2; and Figure 5 is a fragmentary cross sectional view similar to Figure 4 but of a portion of the vehicle immediately above the portion shown in Figure 4.

With continued reference to the drawings, the vehicle comprises a wheel supported chassis portion, as generally indicated at A, and a separate passenger compartment or body portion, as generally indicated at B.

The chassis portion A includes a frame which comprises the two frame side members 10 and 11 of box shaped cross section, front and rear wheels as indicated at 12 and 13, connected to the frame by spring suspension means of a form well known to the art, the rear wheels 13 being mounted on a rear axle of known construction, an engine compartment 14 which includes an engine, not illustrated, drivingly connected to the rear wheels through the rear axle and transmission means of known construction, front fenders 15 disposed one at each side of the engine compartment 14 and carrying the usual head lamps 16, rear fenders 17 disposed at the opposite sides of a rear trunk compartment 18 and carrying the usual tail lights 19 and front and rear bumpers 20 and 21 secured to the frame at the front and rear ends of the latter. The chassis portion of the vehicle, in addition to the engine and drive means, carries the usual brake mechanism and steering mechanism and other equipment, such as the electrical system of the vehicle.

The chassis portion has between the front and rear wheels of the vehicle a flat floor 22 mounted on the top surfaces of the frame side members 10 and 11 and extending laterally beyond the outer sides of these frame members, a front or fire wall 23 inclined upwardly from the front end of the floor 22 at the rear end of the engine compartment 14 and a rear or trunk wall 24 inclined upwardly and rearwardly from the rear end of the floor 22 at the front end of the trunk compartment 18 of the chassis portion of the vehicle.

The floor 22 is preferably continuous with the front or fire wall 23 and the rear or trunk wall 24 and this structure is provided with upwardly extending flanges 25 and 26 disposed outwardly of the outer sides of the frame side members 10 and 11 and of hollow construction and elongated, substantially rectangular cross sectional shape. The flange 25 has vertically disposed, flat and substantially parallel outer and inner side walls 27 and 28 and flange 26 has corresponding outer and inner flat side walls 29 and 30 substantially vertically disposed in spaced apart and parallel relationship to each other.

Sheet metal skirts 31 and 32 extend along the outer sides of the chassis portion of the vehicle between the front and rear fenders on the same side of the vehicle and these skirts have their upper edges extending along and secured to the outer walls 27 and 29 of the flanges 25 and 26 and depend from these flanges in covering relationship to the outer sides of the frame side members 10 and 11, as shown in Figure 2. The skirts are provided with rolled beads along their upper edges which are spaced from the upper edges of the corresponding flanges 25 and 26 and the front and rear fenders together with the rear end of the engine compartment 14 and the front end of the trunk compartment 18 are also provided with rolled bead formations spaced from the upper or outer edges of the flanges, it being noted that the flanges constitute a unitary structure completely surrounding the cavity provided in the chassis portion A of the vehicle to receive the vehicle body portion B.

The body portion B comprises sides 35 and 36 connected at their front ends by a curved cowl structure 37 and at their rear ends by a curved deck structure 38. The sides of the body have outer and inner walls, as indicated at 39 and 40 and 41 and 42 for the sides 35 and 36 respectively and are provided with doors, as indicated at 43. A top 44 is mounted on the sides 35 and 36 of the body and disposed above the top edges of the sides and a windshield 45 extends from the front edge of the top 44 to the rear edge of the cowl 37 while a rear window structure 46 extends from the rear edge of the top to the front edge of the deck structure 38 and the top edges of the rear portions of the sides 35 and 36.

An instrument panel 48 of known construction is disposed in the body depending from the rear edge of the cowl 37 and front and rear seats 49 and 50 are provided in the body portion B of the vehicle in the usual locations.

A steering column 51 is inclined upwardly and rearwardly from the lower portion of the fire wall 23 toward the front driver's seat and a brake pedal 52 inclines upwardly and rearwardly from the lower portion of the fire wall below the steering column 51. An accelerator or throttle control pedal 53 is provided in the body portion A adjacent the brake pedal 52 and a manual control 54, such as a carburetor choke control, extends through the fire wall and is mounted in the instrument panel 48 of the vehicle, as illustrated in Figure 5. The usual instruments will also be mounted in the instrument panel and suitable drive control means will be mounted on the steering column adjacent the steering wheel 55 carried on the upper end of the steering column 51.

The body portion B has a flat floor 56, a flat front wall 57 extending upwardly from the front end of the floor 56 and a rear wall 58 inclined upwardly and rearwardly from the rear end of the floor 56.

The floor 56 and the front and rear walls 57 and 58 constitute a continuous structure surrounded by an upwardly projecting marginal formation, as indicated at 59 and 60 in Figure 2, of channel shaped cross section which overlies the upper edge of the flange formation including the side portions 25 and 26.

The formation 59—60 has spaced apart and substantially parallel outer and inner walls, as indicated at 61 and 62 and 63 and 64 in Figure 2 and the inner walls 62 and 64 are substantially parallel to and spaced inwardly from the inner walls 28 and 30 of the flanges 25 and 26 while the outer walls 61 and 63 are rolled or doubled to provide rolled edges 65 and 66 which are spaced outwardly from the outer walls 27 and 29 of the flanges and also spaced from the rolled edges 67 and 68 which extend along the rear edge of the engine compartment 14, the front edge of the trunk compartment 18, and the upper edges of the skirts 31 and 32.

The sides 35 and 36 of the body and the cowl portion 37 and deck portion 38 are supported at their bottom edges on the upper surface of the channel shaped, marginal formation 59—60 and rigidly secured to this formation by suitable means, not illustrated, a sealing strip 69 of suitable elastic material, extending entirely around the lower edge of the body portion and being compressed between the structure including the sides, cowl structure and the deck structure and the upper edge of the formation 59—60 to form a weather-tight seal between the upper and lower members of the body portion.

The floor 56 is disposed above and substantially parallel to the floor 22 and a flat, pneumatic cushion 70 is disposed between the floors 56 and 22 and inflated with air at a predetermined pressure to resiliently support the body portion B of the vehicle on the chassis portion A. A supplemental cushion 71, also inflated with air at a predetermined pressure, is disposed between the front wall 57 of the body portion B and the front or fire wall 23 of the chassis portion A of the vehicle and a third supplemental cushion, not illustrated, may be disposed at the rear end of the cushion 70 and between the trunk wall 24 and rear wall 58 or, the cushion 70 may itself be extended rearwardly between the trunk wall of the chassis portion and the rear wall of the body portion, if desired. A tubular cushion having side portions, as indicated at 72 and 73 in Figure 2, and of elongated, substantially rectangular cross sectional shape, extends around the lower portion of the body portion B of the vehicle and is disposed between the inner walls 62—64 of the formation 59—60 and the inner wall of the flange formation 28—29 to cushion the body portion B against movements laterally and forwardly and rearwardly of the chassis portion A of the vehicle.

The cushion 70 vertically supports the body portion B on the chassis portion A and a flat pad 75 of resiliently flexible material, such as expanded rubber, is disposed between the lower side of the pneumatic cushion 70 and the chassis floor 22 to provide a cushioning support in the event the cushion 70 should become accidentally deflated or should be collapsed by excessive force exerted thereon.

The pneumatic cushions will all be formed of a suitable pliable sheet material, such as a heavy nylon fabric impregnated with rubber to render the material air-impervious and wear-resistant.

The cushion 70 is provided at spaced apart locations with registering apertures in its top and bottom portions and with sleeves, as indicated at 76 and 77, extending transversely therethrough and connecting the top and bottom sides or portions of the cushion in surrounding relationship to corresponding registering apertures in these top and bottom portions to provide sealed openings extending through the cushion at spaced apart locations over the area of the cushion. The floor 56 of the body portion B is provided with depressions, as indicated at 78 and 79, of circular shape one over each of the sleeves as indicated at 76 and 77 and each of these depressions is provided with a central aperture in registry with the bore of the corresponding sleeve. The pad 75 and the floor 22 of the chassis portion of the vehicle are provided with apertures registering with the bores of the sleeves 76 and 77 and hold down bolts, as indicated at 80 and 81 extend one through each of the sleeves and through the floor of the body and chassis portions of the vehicle. Each bolt is provided on its upper end with a head, as indicated at 82, of spherical shape and a washer, as indicated at 83, is disposed in the corresponding recess in the floor 56 in surrounding relationship to the associated bolt with the spherical head of the bolt bearing on the upper surface of the washer. A flat washer, as indicated at 84, surrounds each of the bolts at the underside of the chassis floor 22 and the chassis floor is provided with downwardly extending dimple or ridge formations 85 holding the associated washer against lateral movement. A sleeve 86 of resiliently elastic material, such as rubber, and substantially cylindrical shape is provided with a longitudinally extending bore receiving the bolt 80 below the washer 84 and a second flat washer 87 receives the bolt at the lower end of the rubber sleeve 86. A nut 88 is threaded onto the lower end of the bolt and retained thereon by a cotter key 89 to hold the bolt in tension between the floor 56 of the body portion of the vehicle and the washer 87 and to hold the sleeve 86 in compression between the nut 88 on the bolt of the floor 22 of the chassis portion of the vehicle. Cover plates 90 of circular shape are secured to the upper surface of the floor 56 of the body portion of the vehicle, one in covering relationship to each of the bolt receiving depressions in this floor.

While only two of the hold down bolt assemblies are illustrated in the drawing and only one assembly is described in detail, it is to be understood that each assembly will comprise the elements as set forth for the single assembly described in detail and that there will be a sufficient number of hold down bolt assemblies properly spaced over the area of the floor 56 of the body portion of the vehicle to firmly secure the body portion B of the vehicle to the chassis portion A thereof against displacement even if the vehicle is subjected to unusual shocks, such as those incident to a collision.

Figure 3 particularly illustrates the manner in which the steering column 51 and the brake pedal 52 are carried through the front walls of the body and chassis portions of the vehicle and through the pneumatic cushion 71 disposed between these front walls.

The front walls 57 and 23 are provided with registering apertures for the steering column and the aperture in the body portion wall 57 is provided with an annular flange 91 of partly conical shape extending from the wall 57 toward the wall 23 and tapering in a direction away from the wall 57, while the aperture in the wall 23 is provided with a rounded or transversely curved annular flange 92 inwardly directed from the wall 23 toward the wall 57 and spaced at its inner end from the adjacent end of the flange 91. A bushing 93 of conical shape and of a hard, resilient material is disposed in the flange 91 and a nut 94 having a partly conical outer surface and a screw threaded coaxial bore is secured in the bushing 93. The tube 95 of the steering column 51 is externally screw threaded at its lower end and threaded through the nut 94 to a location adjacent the inner end of the annular flange 92. The shaft 96 of the steering column extends through the tube 95 and is journaled in a bearing 97 threaded into an internally screw threaded portion of the bore of the tube 95 disposed within the nut 94. A variable length shaft section 98 is disposed in coaxial alignment with the shaft 96 at the lower end of the latter and is connected at one end to the lower end of the shaft 96 by a universal joint 99 and at its other end to the steering worm or cam of the vehicle steering mechanism by a second universal joint 100.

With this arrangement, the portion of the steering column within the body portion of the vehicle can move relative to the steering mechanism carried by the chassis portion of the vehicle without disrupting the connection between the steering shaft and the steering mechanism or causing any binding of the steering gear.

The cushion 71 is provided with a large aperture 101 therein surrounding the flanges 91 and 92 and a transversely curved annular shield 102 of resiliently flexible material is secured at its outer edge to the wall 23 surrounding the aperture in this wall and is secured at its inner end or edge to the bottom end of the steering column tube 95 to provide a dust and moisture proof connection between the fire wall 23 and the bottom end of the steering column tube 95.

At the location of the brake pedal 52 the cushion 71 is provided with registering apertures in its upper and lower portion and with a sleeve 104 extending transversely therethrough in surrounding relationship to the openings therein to provide a sealed aperture through the cushion. A reinforcing sleeve 105 extends through the sleeve 104 and through registering apertures in the walls 57 and 23 and is provided at its opposite ends with outwardly extending, annular flanges 106 and 107 respectively overlying the walls 57 and 23. A bushing 108 is disposed in the bushing 105 and provided with end flanges overlying the flanges 106 and 107 and a bearing bushing 109 extends through the bushing 108 and is provided at its end disposed inwardly of the wall 57 with an external annular flange overlying the adjacent terminal flange on the bushing 108. At its other end this bushing 109 extends beyond the bushing 108 and is screw threaded into the end cap 110 of the master brake cylinder 111 to support the cylinder on the floors 57 and 23 of the vehicle. The brake pedal shaft 112 extends through the bushing 108 and through the end cap 110 of the master cylinder 111 and the brake piston 113 is secured on the end of the shaft 112 disposed within the cylinder 111. A pedal pad or tread 114 of known construction is secured on the other end of the brake shaft 112 so that foot pressure can be applied to the shaft to move the shaft longitudinally outwardly of the body portion of the vehicle to apply the vehicle brakes.

Figure 4 illustrates the manner of mounting the vehicle throttle control pedal and in this arrangement the front wall 57 of the body portion B is provided with a depression 115 of partly spherical shape having an aperture 116 at its center. The fire wall 23 in the chassis portion is provided with an aperture 117 in registry with the aperture 116 and a grommet 118 is secured in the aperture 117 in the wall 23. A push and pull connector, such as a Bowden cable, having a flexible sheath 120 and a core wire 121 longitudinally slidable through the sheath 120 has its sheath extending through the grommet 118 and through the aperture 116 in the depression 115 of the wall 57 and secured to the wall 57. A cover plate 122 is mounted on the wall 57 in covering relationship to the depression 115 and is provided with an aperture 123 flanked by a pair of outwardly projecting apertured lugs, as indicated at 124. The accelerator or throttle control pedal 125 is provided at one end with an outwardly extending arm 126 which is disposed at its proximal end between the lugs 124 and pivotally connected to these lugs by a pivot pin 127 so that the throttle control pedal 125 extends upwardly from the lugs and inwardly of the body portion of the vehicle. At its distal end the arm 126 is provided with an aperture through which the core wire 121 extends and the core wire is provided at the side of the arm 126 remote from the sheath 120 with a rounded head 128 which bears on the arm so that pressure on the pedal 125 will pull the core wire 121 through the sheath 120. A spring, not illustrated, is connected to the core wire 121 at the other end thereof to pull the core wire in the opposite direction and the core wire is attached to the throttle of the vehicle engine in a manner well known to the art. At a location spaced from and below the lugs 124 the cover plate 122 is provided with an outwardly extending projection 129 which provides a heel rest for the foot of the driver of the vehicle when the foot is disposed on the throttle control pedal 125.

The manner of mounting a vehicle control device, such as a choke control or a light switch control is illustrated in Figure 5. In this arrangement the pad 71 is provided with an opening 130 and the walls 57 and 23 are provided with apertures 131 and 132 in registry with the opening 130 in the pad 71. A sleeve or grommet 133 extends through the apertures 131 and 132 and is provided with outwardly projecting annular flanges disposed one at each end thereof and overlying the walls 57 and 23 at the side of these walls remote from the pad 71. The elongated grommet 133 is provided with a bore extending longitudinally therethrough and a flexible push and pull device, such as the Bowden cable 134, extends slidably through the bore of the grommet.

The instrument panel 48 of the vehicle is provided with an aperture 135 in alignment with the bore of the grommet 133 and a fitting 136 is mounted in the aperture 135 and provided with a screw threaded portion 137 at the side of the instrument panel 48 adjacent the wall 57 to which the sheath 138 of the device is secured. The fitting 136 is provided with a longitudinally extending bore and a stem 139 is slidably mounted in this bore and secured at its end nearest the wall 57 to the adjacent end of the core wire 140 of the Bowden cable 134. A pull knob 141 is secured on the other end of the stem 139 and disposed at the side of the instrument panel 48 remote from the wall 57 for pulling and pushing the core wire 140 through the sheath 138 to control a vehicle accessory to which the core wire 140 is attached at its end remote from the knob.

The vehicle instruments, not illustrated, will be mounted in the instrument panel 48 in a manner well known to the art and connected to the appropriate part of the vehicle engine by connectors extending through sleeves or grommets, similar to the sleeve 133 and other controls may be mounted in the vehicle in a manner similar to the service brake pedal and throttle control pedal which have been illustrated and hereinabove described in detail by way of example.

With the pneumatic cushions disposed between the floor and end walls of the body or passenger compartment portion of the vehicle and the floor and end walls of the chassis portion, the body portion will be cradled in the chassis portion and will be insulated from vibrations and shock to which the chassis portion of the vehicle is subjected so that passengers riding in the body portion will not be annoyed by minor shocks, vibrations and noise. The riding qualities of the vehicle can also be controlled to some extent by the inflation pressure of the cushions 70, 71 and 72.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An automotive passenger vehicle comprising a chassis portion having a floor and front and rear walls extending upwardly from said floor, a body portion having a floor disposed above the floor of said chassis portion and front and rear walls extending upwardly from the floor of said body portion and disposed inwardly of the front and rear walls respectively of said chassis portion, pneumatic cushions disposed in end to end relationship between the floor and the front and rear walls of said chassis portion and the floor and the front and rear walls of said body portion, sleeves of resiliently elastic material extending transversely through the portion of said cushions between said floor portions, fasteners extending through said sleeves and connecting said body portion to said chassis portion for limited freedom of resiliently resisted movement between said body and chassis portions, and a flat pad of elastic material disposed between one of said floors and the pneumatic cushion disposed between said floors.

2. In a vehicle having a chassis provided with a floor portion, a body provided with a floor portion superimposed relative to the floor portion of said chassis, and a pneumatic cushion of flexible sheet material disposed between said floor portions, means securing said body to said chassis comprising a sleeve of resiliently elastic material disposed in said cushion and having a length substantially equal to the thickness of said cushion and joined at its ends to the top and bottom walls of the cushion, said sleeve having a bore extending longitudinally therethrough and registering with openings in the top and bottom walls of said cushion, and said body and chassis floor portions having apertures therein registering with the bore of said sleeve, an elongated fastener extending through said sleeve and floor portions and having on one end an abutment engaging the floor portion of said body and on its other end an abutment spaced from the floor portion of said chassis, and resilient means interposed between the floor portion of said chassis and the fastener abutment spaced from the chassis floor portion.

3. In a vehicle having a chassis provided with a front end wall, a body provided with a front end wall spaced from the front end wall of said chassis, and a pneumatic cushion of flexible sheet material disposed between the front end walls of said chassis and said body, brake actuating means for said vehicle comprising a first sleeve extending through said cushion and said end walls and having terminal flanges engaging said end walls at the sides of the latter remote from each other, a second sleeve extending through said first sleeve and having at one end a formation supporting said second sleeve on the end of said first sleeve extending through said body end wall, a brake master cylinder secured at one end to the other end of said second sleeve, a brake shaft extending slidably through said second sleeve and at one end into said master cylinder, and a pedal pad secured on the other end of said shaft and spaced from the end wall of said body.

References Cited in the file of this patent

UNITED STATES PATENTS

| | | |
|---|---|---|
| 699,709 | Pulbrook | May 13, 1902 |
| 850,387 | Mather | Apr. 16, 1907 |
| 1,071,335 | Pembroke | Aug. 26, 1913 |
| 2,223,395 | Van Buren | Dec. 3, 1940 |

FOREIGN PATENTS

| | | |
|---|---|---|
| 514,391 | Great Britain | Nov. 7, 1939 |
| 940,185 | France | May 10, 1948 |